US012618386B2

(12) United States Patent
Tsuneishi

(10) Patent No.: US 12,618,386 B2
(45) Date of Patent: May 5, 2026

(54) INTERNAL COMBUSTION ENGINE

(71) Applicant: TOYOTA JIDOSHA KABUSHIKI KAISHA, Toyota (JP)

(72) Inventor: Naoki Tsuneishi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 40 days.

(21) Appl. No.: 18/969,817

(22) Filed: Dec. 5, 2024

(65) Prior Publication Data

US 2025/0283440 A1 Sep. 11, 2025

(30) Foreign Application Priority Data

Mar. 7, 2024 (JP) ................................ 2024-035079

(51) Int. Cl.
*F02M 25/06* (2016.01)
*F01M 13/00* (2006.01)
*F01M 13/04* (2006.01)

(52) U.S. Cl.
CPC ........ *F02M 25/06* (2013.01); *F01M 13/0011* (2013.01); *F01M 13/04* (2013.01)

(58) Field of Classification Search
CPC ....................................................... F02M 25/06
See application file for complete search history.

(56) References Cited

U.S. PATENT DOCUMENTS 6,148,806 A * 11/2000 Mueller ............... F01M 13/023 123/572
6,866,019 B1 * 3/2005 Schmitz ................. F02M 7/133 123/344
2019/0316500 A1 * 10/2019 Miyanaga .......... F01M 13/0011
2020/0271027 A1 * 8/2020 Tamura ............. F01M 13/0011

FOREIGN PATENT DOCUMENTS

JP 2020-133607 A 8/2020

* cited by examiner

*Primary Examiner* — Syed O Hasan
(74) *Attorney, Agent, or Firm* — SoraIP, Inc.

(57) ABSTRACT

An internal combustion engine includes a blow-by gas passage. The internal combustion engine further includes a ventilation case provided at an intermediate position of the blow-by gas passage. The internal combustion engine further includes a positive crankcase ventilation (PCV) valve provided in the blow-by gas passage and attached to the ventilation case. The PCV valve regulates the amount of blow-by gas flowing through the blow-by gas passage. The internal combustion engine further a plate covering the PCV valve and attached to the ventilation case. The internal combustion engine further includes a cover covering the plate and in contact with part of the plate.

4 Claims, 3 Drawing Sheets

INTERNAL COMBUSTION ENGINE

CROSS-REFERENCE TO RELATED APPLICATION

This application claims priority to Japanese Patent Application No. 2024-035079 filed on Mar. 7, 2024, incorporated herein by reference in its entirety.

BACKGROUND

1. Technical Field

The present disclosure relates to internal combustion engines.

2. Description of Related Art

Japanese Unexamined Patent Application Publication No. 2020-133607 (JP 2020-133607 A) discloses a positive crankcase ventilation (PCV) valve. The PCV valve is provided in a blow-by gas passage. The PCV valve regulates the amount of blow-by gas flowing through the blow-by gas passage. The blow-by gas passage is a passage for causing blow-by gas that has leaked from a combustion chamber of an internal combustion engine into a crankcase to flow into an intake system of the internal combustion engine. The PCV valve is covered by a plate in order to prevent the PCV valve from being removed from the internal combustion engine.

SUMMARY

The plate vibrates while the internal combustion engine is running. This may generate noise.

Hereinafter, means for solving the above issue and its functions and effects will be described.

One aspect of the present disclosure is an internal combustion engine. The internal combustion engine includes:

- a blow-by gas passage that causes blow-by gas that has leaked from a combustion chamber of the internal combustion engine into a crankcase to flow into an intake system of the internal combustion engine;
- a ventilation case provided at an intermediate position of the blow-by gas passage;
- a positive crankcase ventilation (PCV) valve provided in the blow-by gas passage and attached to the ventilation case, the PCV valve being configured to regulate an amount of the blow-by gas flowing through the blow-by gas passage;
- a plate covering the PCV valve and attached to the ventilation case; and
- a cover covering the plate and in contact with part of the plate.

The above configuration can reduce vibration of the plate while the internal combustion engine is running. As a result, noise can be reduced.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Configuration of the Internal Combustion Engine 100

Figure 1:
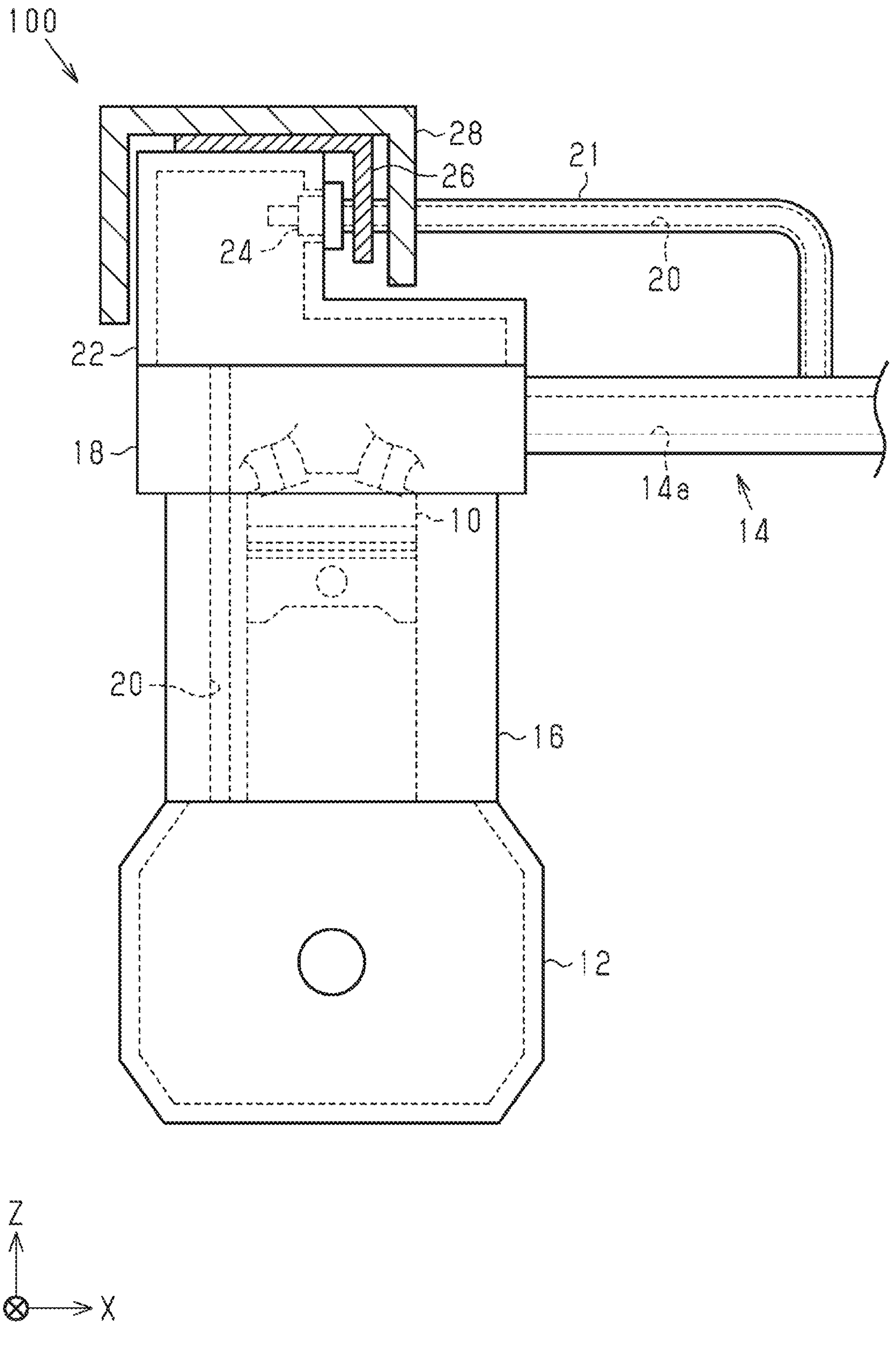
FIG. 1 is a schematic diagram illustrating a configuration of an internal combustion engine according to an embodiment.

Hereinafter, an internal combustion engine according to an embodiment will be described with reference to the drawings. As shown in FIG. 1, the internal combustion engine 100 includes a cylinder block 16. The internal combustion engine 100 has a cylinder head 18 attached to an upper end portion of the cylinder block 16. The internal combustion engine 100 has a crankcase 12 attached to a lower end portion of the cylinder block 16. An upper portion of the cylinder head 18 is covered with a ventilation case 22.

When the combustion of the fuel in the combustion chamber 10 of the internal combustion engine 100 is performed, blow-by gas leaks from the combustion chamber 10 of the internal combustion engine 100 to the crankcase 12. The internal combustion engine 100 includes a blow-by gas reduction device for flowing blow-by gas leaked to the crankcase 12 to the intake system 14 of the internal combustion engine 100. FIG. 1 shows an intake passage **14*a* which is part of the intake system 14**.

The blow-by gas reduction device has a blow-by gas passage 20 for causing the blow-by gas to flow into the intake system 14 of the internal combustion engine 100. The blow-by gas reduction device includes a positive crankcase ventilation (PCV) valve 24 for regulating the quantity of blow-by gas flowing through the blow-by gas passage 20. The PCV valve 24 is provided in the blow-by gas passage 20 and is attached to the ventilation case 22.

The blow-by gas passage 20 communicates with the crankcase 12. The blow-by gas passage 20 extends in the cylinder block 16 and in the cylinder head 18. The inside of the ventilation case 22 is part of the blow-by gas passage 20. As described above, PCV valve 24 is attached to the ventilation case 22. A hose 21 connects PCV valve 24 and the intake passage **14*a*. The inside of the hose 21 is part of the blow-by gas passage 20. In this way, the blow-by gas passage 20 communicates with the intake passage 14*a***.

As described above, the ventilation case 22 is provided in the middle of the blow-by gas passage 20. The PCV valve 24 is provided at an intermediate position of the blow-by gas passage 20. As described above, PCV valve 24 regulates the amount of blow-by gas flowing through the blow-by gas passage 20. Accordingly, the flow rate of the blow-by gas flowing from the crankcase 12 to the intake passage **14*a*** changes.

The internal combustion engine 100 includes a plate 26 covering the PCV valve 24 and attached to the ventilation case 22. The internal combustion engine 100 includes a cover 28 covering the plate 26 and in contact with part of the plate 26. The cover 28 is a urethane cover 28 made of urethane and surrounds PCV valve 24.

Figure 2:
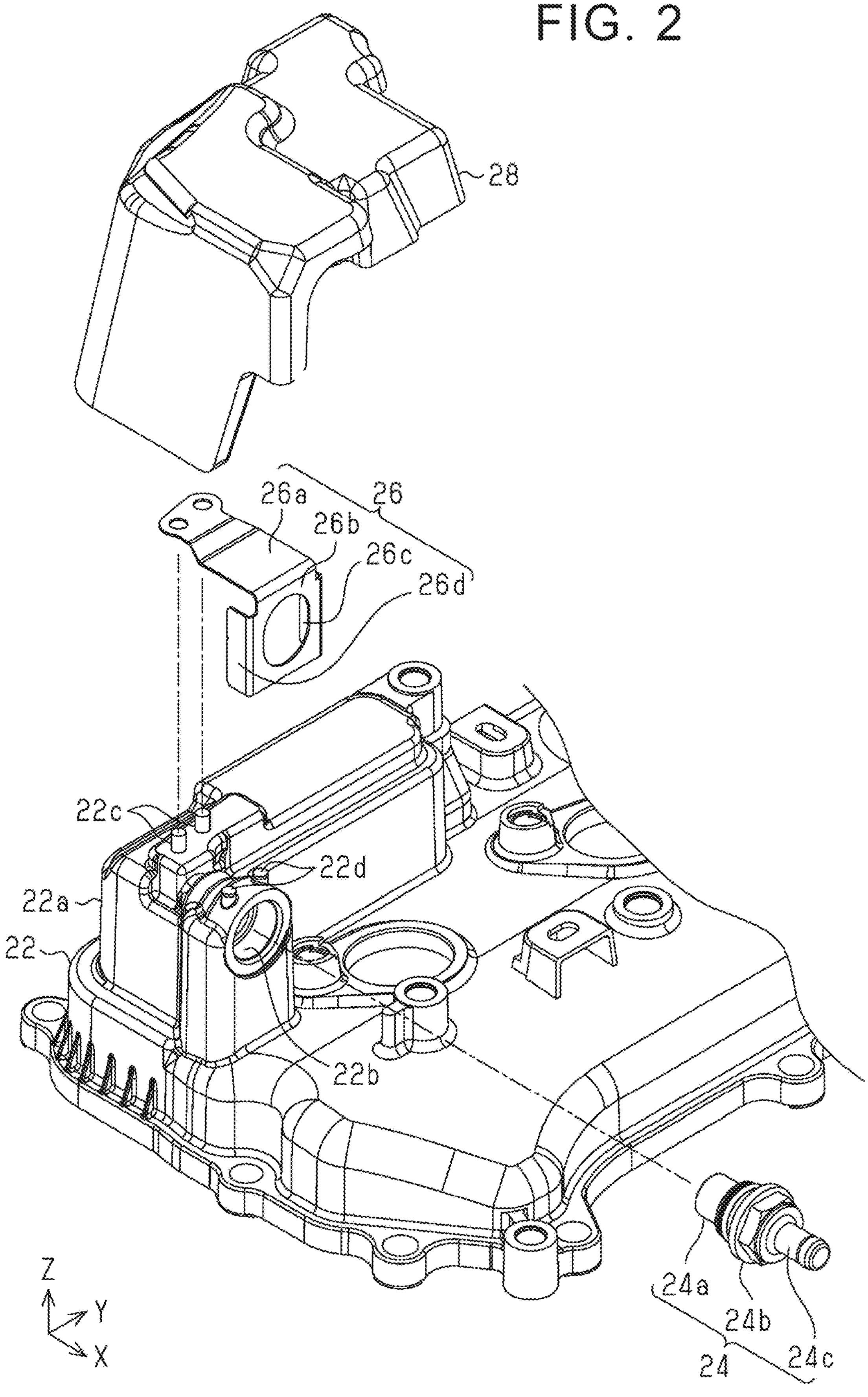
FIG. 2 is an exploded perspective view showing a plurality of members attached to a ventilation case of the internal combustion engine shown in FIG. 1.

How to Attach the PCV Valve 24, the Plate 26, and the Cover 28 to the Ventilation Case 22 in this Order Referring to FIG. 2, how to attach PCV valve 24, the plate 26, and the cover 28 to the ventilation case 22 in this order will be described. The ventilation case 22 has a mount portion **22*a* that is a protruding portion of the ventilation case 22. The mount portion 22*a* has a mount hole 22*b***.

First, in the first stage, the PCV valve 24 is attached to the ventilation case 22 in such a manner that the entire first portion 24*a* of PCV valve 24 is located in the mount hole 22*b* of the mount portion 22*a*. The second portion 24*b* of the PCV valve 24 that is continuous with the first portion 24*a* is located outside the mount hole 22*b*. The PCV valve 24 has the largest diameter in the second portion 24*b*. Further, the second portion 24*b* of PCV valve 24 covers the entire mount hole 22*b*. Further, PCV valve 24 has a third portion 24*c* extending from the second portion 24*b* in a direction away from the mount hole 22*b*. The third portion 24*c* is a portion to which the hose 21 is connected.

Figure 3:
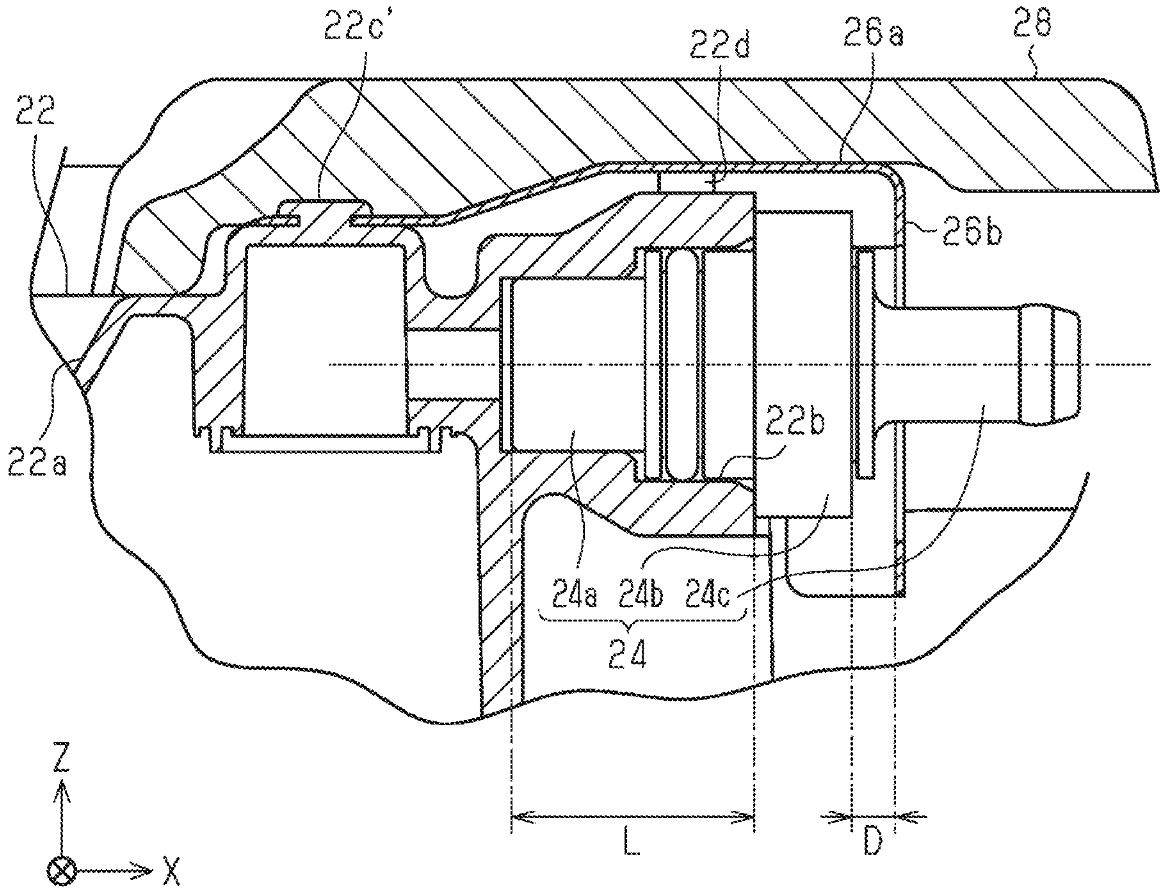
FIG. 3 is a cross-sectional view showing a part of the ventilation case of the internal combustion engine shown in FIG. 1 in which PCV valve is fixed.

Next, in a second stage, the plate 26 is attached to the ventilation case 22 over PCV valve 24. More specifically, first, the third portion 24*c* of PCV valve 24 is passed through a hole in the bent portion 26*b* described later. The two cylindrical portions 22*c* of the mount portion 22*a* are then passed through the two holes in the cantilevered portion 26*a* of the plate 26. Then, the two cylindrical portions 22*c* are deformed by being heated. As a result, the plate 26 is welded to the mount portion 22*a*. Note that FIG. 3 shows the cylindrical portion 22*c*' after the modification.

The plate 26 has a cantilevered portion 26*a* partially fixed to the mount portion 22*a* of the ventilation case 22, and a bent portion 26*b* bent and extended from the cantilevered portion 26*a*. The cantilevered portion 26*a* is supported by two protrusions 22*d* of the mount portion 22*a*. The bent portion 26*b* partially covers the second portion 24*b* of the PCV valve 24 in the axial direction of the mount hole 22*b*. The bent portion 26*b* does not cover the third portion 24*c* of the PCV valve 24 in the axial direction of the mount hole 22*b*. The plate 26 further has a first side portion 26*c* and a second side portion 26*d* extending from the bent portion 26*b* toward PCV valve 24 in the axial direction of the mount hole 22*b*.

Finally, in a third stage, a cover 28 is attached to the ventilation case 22 over the plate 26.

PCV Valve 24 and its Surroundings

Referring to FIG. 3, PCV valve 24 and its periphery will be described. The cover 28 contacts the entire cantilevered portion 26*a*. The second portion 24*b* of the PCV valve 24 and the bent portion 26*b* in the axial direction of the mount hole 22*b* are separated from each other by a distance D. The second portion 24*b* has a facing surface facing the bent portion 26*b* and perpendicular to the axial direction of the mount hole 22*b*. The distance D is a distance between the opposite surface of the second portion 24*b* and the bent portion 26*b* in the axial direction of the mount hole 22*b*. The distance D is shorter than the length L of the first portion 24*a* of PCV valve 24 in the axial direction of the mount hole 22*b*.

Operation and Effect of the Present Embodiment

The internal combustion engine 100 includes a blow-by gas passage 20 for causing blow-by gas that has leaked from the combustion chamber 10 of the internal combustion engine 100 into the crankcase 12 to flow into the intake system 14 of the internal combustion engine 100. The internal combustion engine 100 further includes a ventilation case 22 provided at an intermediate position of the blow-by gas passage 20. The internal combustion engine 100 further includes a positive crankcase ventilation (PCV) valve 24 provided in the blow-by gas passage 20 and attached to the ventilation case 22. The PCV valve 24 is configured to regulate the amount of blow-by gas flowing through the blow-by gas passage 20. The internal combustion engine 100 further includes a plate 26 covering PCV valve 24 and attached to the ventilation case 22. Internal combustion engine 100 further includes a cover 28 covering plate 26 and in contact with part of the plate 26.

A cover 28 is in contact with part of the plate 26. This configuration can reduce vibration of the plate 26 while the internal combustion engine 100 is running. As a result, noise can be suppressed.

Also, since the cover 28 is in contact with part of the plate 26, this increases the resonant frequency of the plate 26. As the resonance frequency moves away from the forced frequency, the vibration of the plate 26 is suppressed.

The ventilation case 22 has a mount portion 22*a* that is a protruding portion of the ventilation case 22. PCV valve 24 is attached to the ventilation case 22 as will be described below. The entire first portion 24*a* of PCV valve 24 is inserted into the mount hole 22*b* of the mount portion 22*a*. Further, the second portion 24*b* of PCV valve 24 that is continuous with the first portion 24*a* is located outside the mount hole 22*b*. Further, the second portion 24*b* of PCV valve 24 covers the entire mount hole 22*b*. The PCV valve 24 has a third portion 24*c* extending from the second portion 24*b* in a direction away from the mount hole 22*b*. The PCV valve 24 has the largest diameter in the second portion 24*b*.

The plate 26 has a cantilevered portion 26*a* partially fixed to the mount portion 22*a* of the ventilation case 22, and a bent portion 26*b* bent and extended from the cantilevered portion 26*a*. The bent portion 26*b* partially covers the second portion 24*b* of the PCV valve 24 in the axial direction of the mount hole 22*b*. The bent portion 26*b* does not cover the third portion 24*c* of the PCV valve 24 in the axial direction of the mount hole 22*b*. The distance D between the second portion 24*b* of the PCV valve 24 and the bent portion 26*b* in the axial direction of the mount hole 22*b* is smaller than the length L of the first portion 24*a* of the PCV valve 24 in the axial direction of the mount hole 22*b*.

In the above configuration, the bent portion 26*b* partially covers the second portion 24*b* of the PCV valve 24 in the axial direction of the mount hole 22*b*. The distance D between the second portion 24*b* of the PCV valve 24 and the bent portion 26*b* in the axial direction of the mount hole 22*b* is smaller than the length L of the first portion 24*a* of the PCV valve 24 in the axial direction of the mount hole 22*b*. Therefore, the bent portion 26*b* restricts the first portion 24*a* of PCV valve 24 from being removed from the mount hole 22*b*. That is, if the plate 26 is not removed from the ventilation case 22, it is difficult to remove the first portion 24*a* of PCV valve 24 from the mount hole 22*b*. Therefore, it is possible to restrain the PCV valve 24 from being removed from the ventilation case 22.

The cover 28 contacts the entire cantilevered portion 26*a*.

Since the cover 28 is in contact with the entire cantilevered portion 26*a*, it is easier to suppress the oscillation of the plate 26 as compared with a configuration in which the cover 28 is in contact with only a part of the cantilevered portion 26*a*.

The plate 26 is welded to the mount portion 22*a*.

According to the above configuration, the plate 26 is less likely to be removed.

The cover 28 is a urethane cover 28 made of urethane and surrounds PCV valve 24.

In the above-described configuration, the heat insulating power of PCV valve 24 by the cover 28 is increased.

Example of Change

The present embodiment can be modified and implemented as follows. The present embodiment and modification examples described below may be carried out in combination of each other within a technically consistent range.

In the above embodiment, the upper portion of the cylinder head 18 is covered by the ventilation case 22. However, this is only an example. For example, the ventilation case 22 may be attached to the cylinder block 16.

In the above embodiment, the plate 26 has a first side portion 26*c* and a second side portion 26*d*. At least one of the first side portion 26*c* and the second side portion 26*d* may be omitted.

In the above-described embodiment, the plate 26 is welded to the mount portion 22*a*. Alternatively, the plate 26 may be caulked to the mount portion 22*a*.

In the above-described embodiment, as described above, the distance D is shorter than the length L. The distance D may be greater than or equal to the length L. In the above embodiment, the cover 28 contacts the entire cantilevered portion 26*a*. However, the cover 28 may only touch a part of the cantilevered portion 26*a*.

In the above embodiment, the cover 28 is a urethane cover 28 formed of urethane. However, this is only an example. For example, the cover 28 may be formed of a resin other than urethane.

What is claimed is:

1. An internal combustion engine, comprising:

a blow-by gas passage that causes blow-by gas that has leaked from a combustion chamber of the internal combustion engine into a crankcase to flow into an intake system of the internal combustion engine;

a ventilation case provided at an intermediate position of the blow-by gas passage;

a positive crankcase ventilation valve provided in the blow-by gas passage and attached to the ventilation case, the positive crankcase ventilation valve being configured to regulate an amount of the blow-by gas flowing through the blow-by gas passage;

a plate covering the positive crankcase ventilation valve and attached to the ventilation case; and a cover covering the plate and in contact with part of the plate, wherein the ventilation case includes a mount portion that is a protruding portion of the ventilation case, and the positive crankcase ventilation valve is attached to the ventilation case in which a first portion of the positive crankcase ventilation valve is entirely located in a mount hole of the mount portion, a second portion of the positive crankcase ventilation valve that is continuous with the first portion is located outside the mount hole, and the second portion of the positive crankcase ventilation valve covers an entirety of the mount hole, the plate includes a cantilevered portion partially fixed to the mount portion of the ventilation case and a bent portion bent from the cantilevered portion, and the bent portion partially covers the second portion of the positive crankcase ventilation valve in an axial direction of the mount hole, and the cover is in contact with an entirety of the cantilevered portion.

2. The internal combustion engine according to claim 1, wherein the ventilation case includes a mount portion that is a protruding portion of the ventilation case, and the positive crankcase ventilation valve is attached to the ventilation case in which a first portion of the positive crankcase ventilation valve is entirely located in a mount hole of the mount portion, a second portion of the positive crankcase ventilation valve that is continuous with the first portion is located outside the mount hole, and the second portion of the positive crankcase ventilation valve covers an entirety of the mount hole, the positive crankcase ventilation valve includes a third portion extending from the second portion in a direction away from the mount hole, and the positive crankcase ventilation valve has a largest diameter in the second portion, the plate includes a cantilevered portion partially fixed to the mount portion of the ventilation case and a bent portion bent from the cantilevered portion, the bent portion partially covers the second portion of the positive crankcase ventilation valve in an axial direction of the mount hole, and the bent portion does not cover the third portion of the positive crankcase ventilation valve in the axial direction of the mount hole, and a distance between the second portion of the positive crankcase ventilation valve and the bent portion in the axial direction of the mount hole is smaller than a length of the first portion of the positive crankcase ventilation valve in the axial direction of the mount hole.

3. The internal combustion engine according to claim 2, wherein the plate is welded to the mount portion.

4. The internal combustion engine according to claim 1, wherein the cover is a urethane cover made of urethane and surrounds the positive crankcase ventilation valve.

* * * * *